(12) United States Patent
Suzuki et al.

(10) Patent No.: US 8,118,125 B2
(45) Date of Patent: Feb. 21, 2012

(54) VEHICLE BODY FLOOR STRUCTURE

(75) Inventors: Hiroyoshi Suzuki, Wako (JP); Sayaka Okuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 12/705,717

(22) Filed: Feb. 15, 2010

(65) Prior Publication Data

US 2010/0213741 A1 Aug. 26, 2010

(30) Foreign Application Priority Data

Feb. 24, 2009 (JP) ................................ 2009-041008

(51) Int. Cl.
*B60R 16/04* (2006.01)
(52) U.S. Cl. ..................................................... 180/68.5
(58) Field of Classification Search .................. 180/68.5
See application file for complete search history.

(56) References Cited

U.S. PATENT DOCUMENTS 6,968,915 B2 * 11/2005 Takagi et al. ............ 180/65.245

FOREIGN PATENT DOCUMENTS

| JP | 60-48361 B2 | 10/1985 |
| JP | 62-19431 | 2/1987 |
| JP | 02-25379 | 2/1990 |
| JP | 08-175203 | 7/1996 |
| JP | 09-136576 | 5/1997 |
| JP | 2005-067427 | 3/2005 |
| JP | 2006-151146 | 6/2006 |
| JP | 2008-100585 | 5/2008 |

* cited by examiner

*Primary Examiner* — J. Allen Shriver, II
*Assistant Examiner* — Erez Gurari
(74) *Attorney, Agent, or Firm* — Rankin, Hill & Clark LLP

(57) ABSTRACT

Vehicle body floor structure has a floor tunnel provided on a laterally central portion of a vehicle body floor panel and extending in a front-rear direction of a vehicle body, a desired stored component being stored in the floor tunnel. The stored component has a passageway formed therein to extend in a width direction of the vehicle body. The floor structure also has a cross member passed through the passageway of the stored component, the stored component is supported on the cross member via a resilient member, and the cross member is fixedly fastened at its opposite ends to the inner surfaces of opposed side walls of the floor tunnel.

6 Claims, 6 Drawing Sheets

FIG.7
(PRIOR ART)
FIG.8
(PRIOR ART)
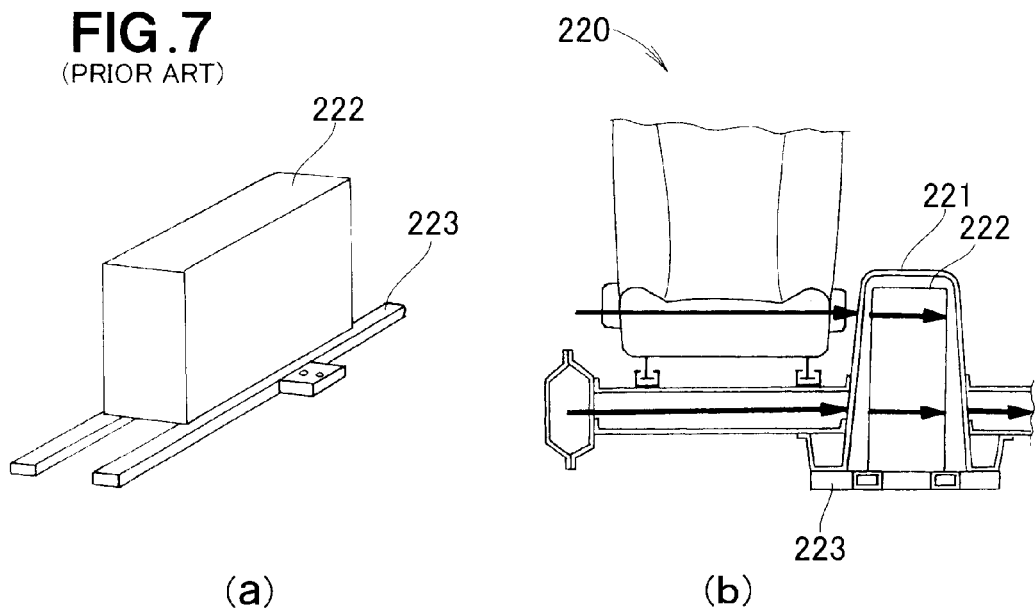
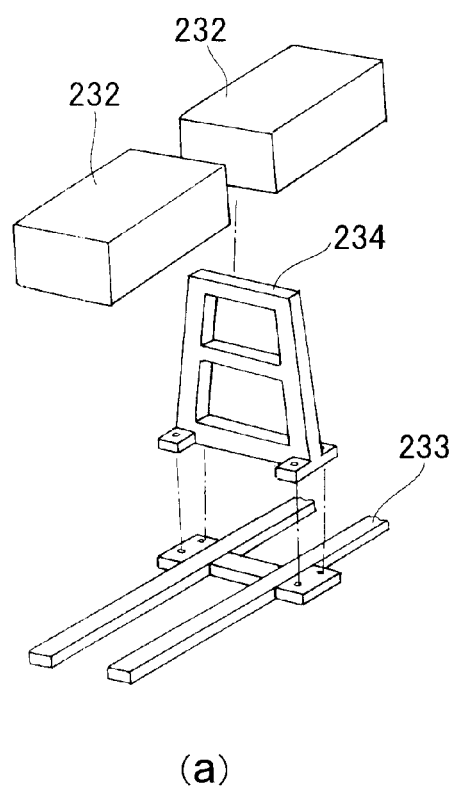

VEHICLE BODY FLOOR STRUCTURE

FIELD OF THE INVENTION

The present invention relates to vehicle body floor structures having a floor tunnel that accommodates or stores a functional component, such as a fuel tank or a fuel cell stack.

BACKGROUND OF THE INVENTION

Heretofore, various anti-collision measures or techniques have been proposed for body floor structures of vehicles, particularly automotive vehicles. For example, vehicles are known in which a cross member is additionally provided in a floor tunnel in order to minimize or suppress deformation of the vehicle at the time of a lateral or side collision. Also known is a vehicle body floor structure constructed to disperse a load, produced by a lateral collision, across the entire vehicle using a seat structure. Examples of such a vehicle body floor structure are disclosed in Japanese Patent Application Laid-Open Publication No. H09-136575 (hereinafter referred to as "patent literature 1") and Japanese Patent Application Laid-Open Publication No. 2005-67427 (hereinafter referred to as "patent literature 2"), where a load applied from a side of the vehicle body is transmitted into a center console or transmitted to the upper surface of the floor tunnel.

In the vehicle body floor structure disclosed in patent literature 1, two hollow beams span between opposed side walls of the center console and are located at positions corresponding to the backs of front seats, so that a load applied from a side of the vehicle body can be transmitted into the center console.

In the vehicle body floor structure disclosed in patent literature 2, left and right side sills are provided on left and right sides of the vehicle body and extend in a front-rear direction of the vehicle body, and a floor tunnel provided on a laterally central portion of the vehicle body and extends in parallel to the left and right side sills. Further, left and right seats are disposed with the floor tunnel interposed therebetween, and a left cross member is provided under the left seat and connecting between the left side sill and the floor tunnel while a right cross member is provided under the right seat and connecting between the right side sill and the floor tunnel.

FIG. 5 hereof shows a conventionally-known vehicle body floor structure 200, in which a tunnel cross member 202 is provided within a floor tunnel 201 so as to minimize deformation of the vehicle body due to a load transmitted from a side sill 203 to the floor tunnel 201 via a seat cross member 204. Further, a load produced by a side collision can be dispersed across the entire vehicle body using the construction of the seat 205.

Environment-friendly vehicles have come to the front in recent years, but these vehicles are more complicated in structure than ordinary vehicles. Further, equipment mounted on the environment-friendly vehicles tends to be great in size.

Thus, in another conventionally-known vehicle body floor structure 210 shown in FIG. 6, a functional component 212 is sometimes mounted within a floor tunnel 211. Among examples of the functional component 212 are a high-voltage electrical system for a hybrid vehicle, a fuel tank of an internal combustion engine, a battery of an electric vehicle, etc. The functional component 212 is supported in the floor tunnel 211 by means of a sub chassis 213. However, in the case where the functional component 212 is mounted within the floor tunnel 211, a load caused by a side collision (i.e., side collision load) must be prevented from being transmitted to the floor tunnel 211, with a view to protecting the functional component 212 from the side collision load.

Thus, in still another conventionally-known vehicle body floor structure 220 shown in FIG. 7, a functional component 222 is constructed to have a relatively great strength and mounted on a sub chassis 223 that is in turn fixed to a floor tunnel 221. Thus, a load caused by a side collision can be safely transmitted to the floor tunnel 221. However, in this case, the functional component 222 itself tends to be great in weight, which would lead to an increased overall weight of the vehicle body.

Thus, in still another conventionally-known vehicle body floor structure 230 shown in FIG. 8, functional components 232 are fixed to a partition wall 234 without being constructed to have a particularly great strength, and these functional components 232 and partition wall 234 are mounted on a sub chassis 233 that is in turn fixed to a floor tunnel 231. However, when a load has been applied from a side of the vehicle body, the functional components 232 fixed to the partition wall 234 may also be undesirably dragged so that there would occur a possibility of the functions of the components 232 being impaired.

Namely, even in the case where a functional component is disposed within the floor tunnel provided on a laterally central portion of the vehicle body, it is desirable that arrangements be made for dispersedly transmitting a load caused by a side collision of the vehicle and preventing the collision load from acting on the functional component provided within the floor tunnel.

SUMMARY OF THE INVENTION

In view of the foregoing prior art problems, it is an object of the present invention to provide an improved vehicle body floor structure which can reliably protect a functional component, disposed within a floor tunnel provided on a laterally central portion of the vehicle body, from an external input force, such as a load caused by a side collision of the vehicle, and can effectively disperse such an external input force.

In order to accomplish the above-mentioned object, the present invention provides an improved vehicle body floor structure, which comprises: a floor tunnel provided on a laterally central portion of a vehicle body floor panel and extending in a front-rear direction of a vehicle body, a stored component being stored in the floor tunnel, the stored component having a passageway formed therein to extend in a width direction of the vehicle body; and a cross member passed through the passageway of the stored component, the stored component being supported on the cross member via a resilient member, the cross member being fixed at opposite ends thereof to the inner surfaces of opposed side walls of the floor tunnel.

The passageway extending through the stored component in the width direction of the vehicle body may be changed in position in the front-rear direction of the vehicle body so that the cross member can be placed or set at a desired position. In this way, the cross member can be set at a suitable position (load input position) to which a load applied from a side of the vehicle can be efficiently transmitted. As a consequence, the present invention can eliminate a need to increase reinforcement of the vehicle body and thereby reduce the weight of the vehicle body.

Further, because the stored component is supported in a substantially floating manner within the floor tunnel by being supported on the cross member via the resilient member, an assembly error can be effectively absorbed, which can thereby facilitate positioning of the cross member relative to the inner surfaces of the opposed side walls of the floor tunnel at the time of assembly. In addition, when a side collision load is input to the cross member, the side collision load can be effectively prevented from acting on the stored component that is supported in a substantially floating manner within the floor tunnel.

Preferably, the stored component is a functional component having a fuel storage function, power generating function or electric power storage function, or a high-voltage electric system. Namely, because the stored component is supported in a substantially floating manner within the floor tunnel by being supported on the cross member via the resilient member as noted above, a functional component having a fuel storage function, power generating function or electric power storage function, or a high-voltage electric system can be stored as the stored component within the floor tunnel.

The stored component may be a fuel cell stack that tends to cause vibrations and noise during generation of electric power. However, because the stored component is supported in a substantially floating manner within the floor tunnel by being supported on the cross member via the resilient member as noted above, vibrations and noise are hardly transmitted to the floor tunnel, so that noise within a passenger compartment can be minimized. The stored component may be a fuel tank.

Preferably, the cross member supports the stored component via a stay member that is supported, via the resilient member, in a substantially floating manner within the floor tunnel. Thus, the stored component can be mounted (sub-assembled) to the cross member in advance, which allows the cross member and stored component to be assembled to the vehicle body with an increased ease.

Preferably, the cross member is fixed at the opposite ends to horizontal bracket bottom surfaces each projecting in a substantially right-angled triangular shape from the inner surface of a corresponding one of the opposed side walls of the floor tunnel. Thus, the cross member can be fixedly fastened to the floor tunnel from below, which can significantly enhance mounting operability of the cross member.

Preferably, the stay member is provided in perpendicularly intersecting relation to the cross member. This arrangement can stably support the stored component that is, for example, elongated in the front-rear direction of the vehicle body. Alternatively, the stay member may be provided in parallel relation to the cross member.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 7 is a view explanatory of still another conventionally-known vehicle body floor structure where a stored component constructed to have a relatively great strength is stored in a floor tunnel; and FIG. 8 is a view explanatory of still another conventionally-known vehicle body floor structure with a stored component stored in a floor tunnel together with a partition wall.

DETAILED DESCRIPTION OF THE PREFERRED EMBODIMENTS

Figure 1:
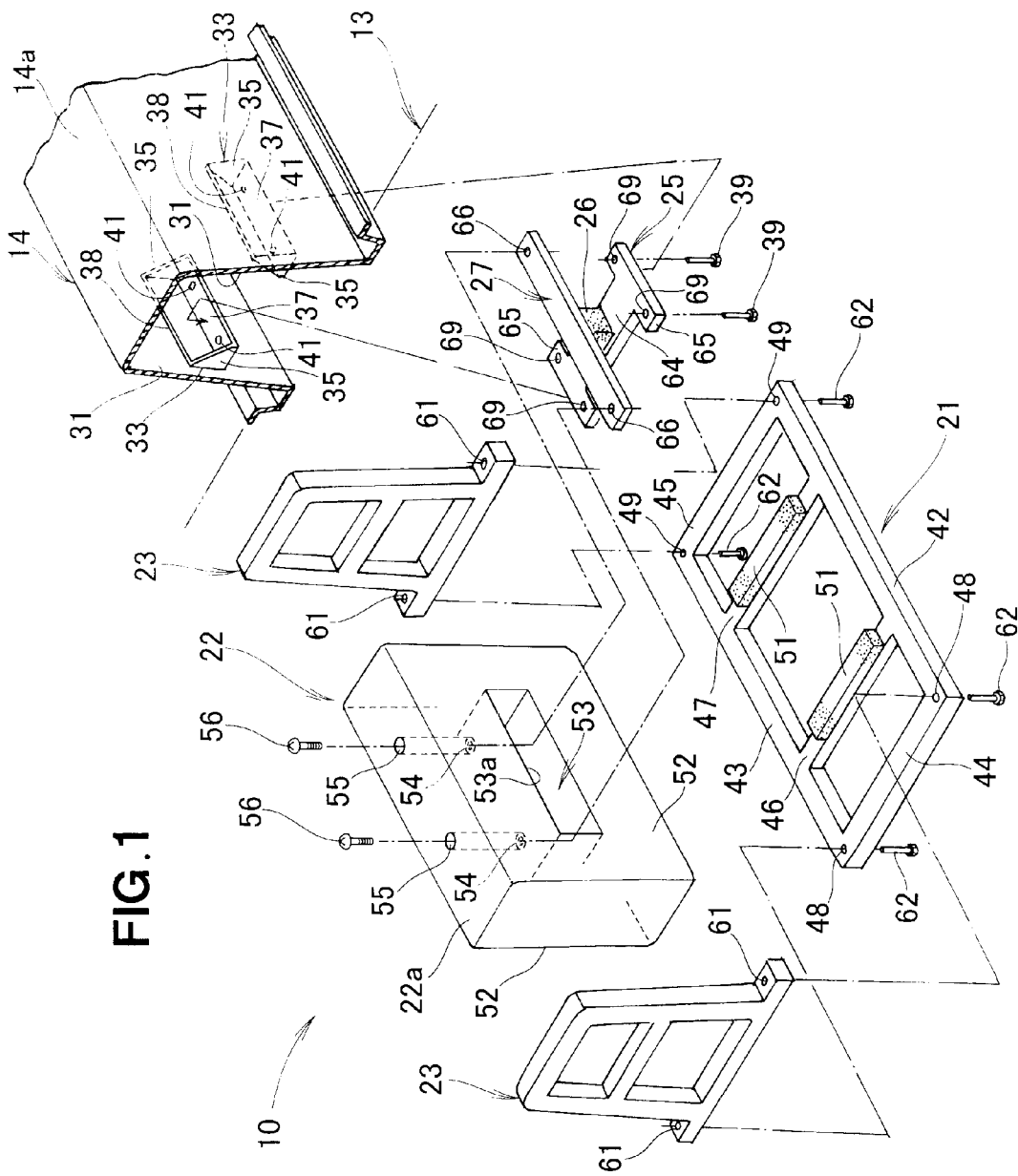
FIG. 1 is an exploded perspective view of an embodiment of a vehicle body floor structure of the present invention.
Figure 2:
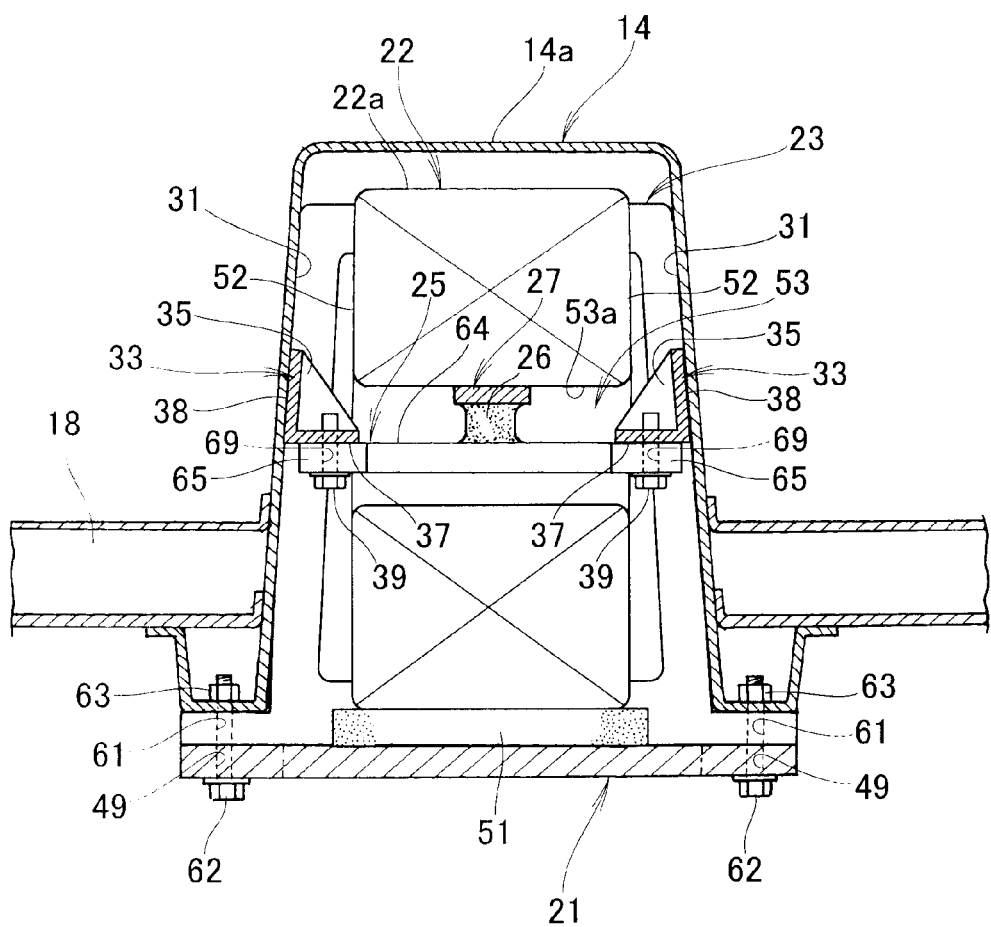
FIG. 2 is a sectional front view of the vehicle body floor structure shown in FIG. 1.

FIG. 1 is an exploded perspective view of an embodiment of a vehicle body floor structure of the present invention, and FIG. 2 is a sectional front view of the vehicle body floor structure shown in FIG. 1. The vehicle body floor structure shown in FIGS. 1 and 2 includes: a floor panel 13 defining a bottom section of a passenger compartment; a floor tunnel 14 provided on a laterally central portion of the floor panel 13 and extending in a front-rear direction of the vehicle body; a sub chassis 21 fixed to the floor tunnel 14; a stored component 22 mounted on the sub chassis 21; front and rear retaining members 23 that retain front and rear end portions of the stored component 22; a cross member 25 fixed to the floor tunnel 14; and a stay member 27 mounted on the cross member 25 via a resilient member 26 for supporting the stored component 22. Namely, the stay member 27 is supported, via the resilient member 26, in a substantially floating manner within the floor tunnel 14; thus, it can be said that the stored component 22 is supported in a substantially floating manner within the floor tunnel 14 by being supported on the cross member 25 via the stay member 27 and resilient member 26.

The floor tunnel 14 has left and right brackets 33 on the inner surfaces 31 of its opposed left and right side walls, and the cross member 25 is fixed to the left and right brackets 33. Each of the left and right brackets 33 has: front and rear projections 35 each projecting inwardly from the inner surface 31 of the left or right side wall; a horizontal bracket bottom surface 37 integrally formed with and extending between the lower end edges of the front and rear projections 35 so that one end portion of the cross member 25 is mounted on the horizontal bracket bottom surface 37; and a vertical surface 38 welded to the inner surface 31 of the left or right side wall.

As viewed from the front of the floor tunnel 14, each of the left and right brackets 33 projects in a right-angled triangular shape from the inner surface 31 of the left or right side wall. The horizontal bracket bottom surface 37 has bolt holes 41 into which bolts 39 are screwed.

The sub chassis 21 includes: left and right longitudinal members 42 and 43 extending in the front-rear direction of the vehicle body; a front cross member 44 connecting between the respective front ends of the left and right longitudinal members 42 and 43; a rear cross member 45 connecting between the respective rear ends of the left and right longitudinal members 42 and 43; and first and second intermediate cross members 46 and 47 connecting between respective intermediate portions of the left and right longitudinal members 42 and 43.

Holes 48 for fixing the front retaining member 23 to the sub chassis 21 are formed in front end portions of the left and right longitudinal members 42 and 43, and holes 49 for fixing the rear retaining member 23 to the sub chassis 21 are formed in rear end portions of the left and right longitudinal members 42 and 43. Resilient cushion members 51 for resiliently supporting the stored component 22 are provided on the upper surfaces of the first and second intermediate cross members 46 and 47. As shown, the sub chassis 21 has a rectangular shape elongated in the front-rear direction of the vehicle body.

The stored component 22 is a functional component having a fuel storage function, power generating function or electric power storage function, or a high-voltage electric system for a hybrid vehicle. More specifically, the functional component may be a fuel tank, a fuel cell stack or a battery; in the instant embodiment, the stored component 22 is a fuel cell stack.

The fuel cell stack 22 has a passageway 53 formed therethrough to extend in the width direction of the vehicle body, i.e. from one side surface 52 to another 52. The cross member 25 is passed through the passageway 53, and the stay member 27 is accommodated in the passageway 53. Mounting portions 54 for mounting the stay member 27 to the fuel cell stack 22 are provided on the upper wall surface 53a of the passageway 53. The fuel cell stack 22 also has vertical through-passage portions 55 each extending from the upper surface 22a of the fuel cell stack 22 down to one of the mounting portions 54. Mounting screws 56 are inserted through the through-passage portions 55 to be screwed into the stay member 27.

The front and rear retaining members 23 retain the fuel cell stack 22 in the front-rear direction of the vehicle body by sandwiching the fuel cell stack 22 in the front-rear direction. Each of the front and rear retaining members 23 has through-holes 61 formed in a lower end horizontal portion thereof and is fastened to left and right lower end horizontal portions of the floor tunnel 14 together with the sub chassis 21 by means of bolts 62 extending upwardly through the holes 48 or 49 and holes 61 to be screwed to nuts 63 (see FIG. 2) welded to the upper surfaces of the left and right lower end horizontal portions of the floor tunnel 14.

The cross member 25 includes a body section 64 passed through the passageway 53 of the fuel cell stack 22. The body section 64 has left and right mounting sections 65 on its left and right ends for fixedly mounting to the left and right brackets 33. Each of the mounting sections 65 has through-holes 69 for passage therethrough of the bolts 39. The cross member 25 has a substantially "I" shape as viewed in plan.

The stay member 27 has screw holes 66 formed in front and rear end portions thereof, into which mounting screws 56 are screwed for fastening the fuel stack cell 22. In the instant embodiment, the stay member 27 is provided in perpendicularly intersecting relation to the cross member 25.

Figure 3A:
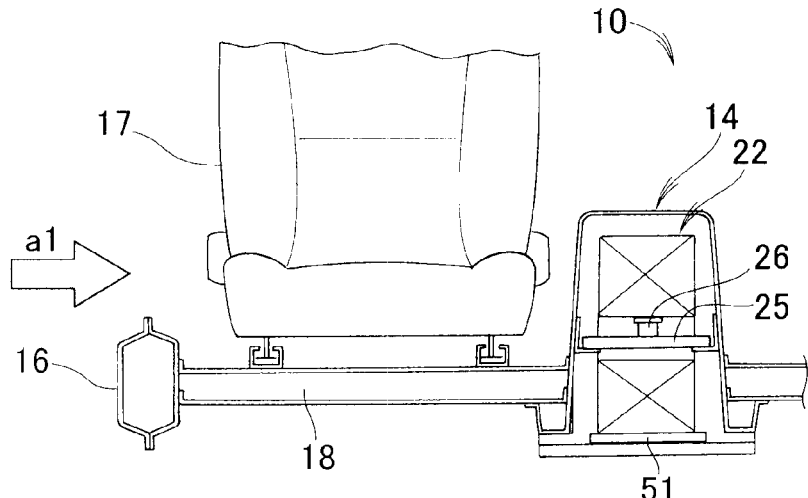
FIGS. 3A to 3C are views explanatory of how a load is transmitted in the vehicle body floor structure shown in FIG. 1.
Figure 3B:
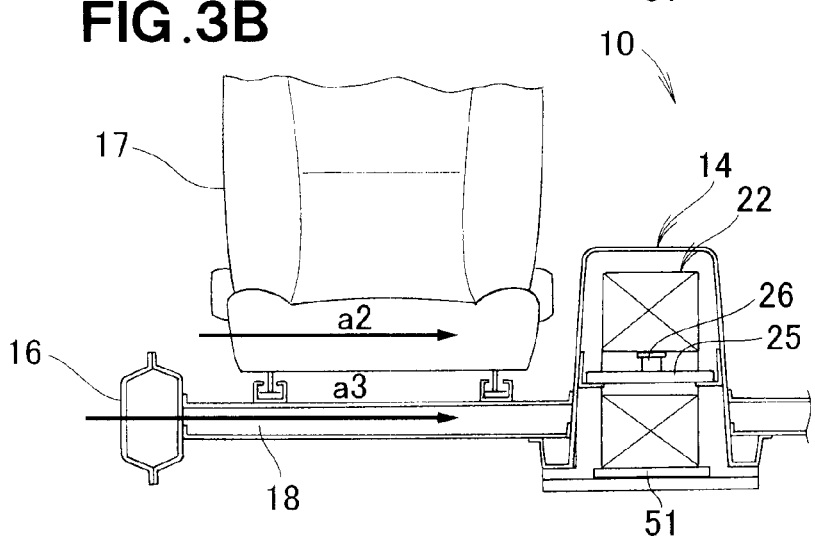
Figure 3C:
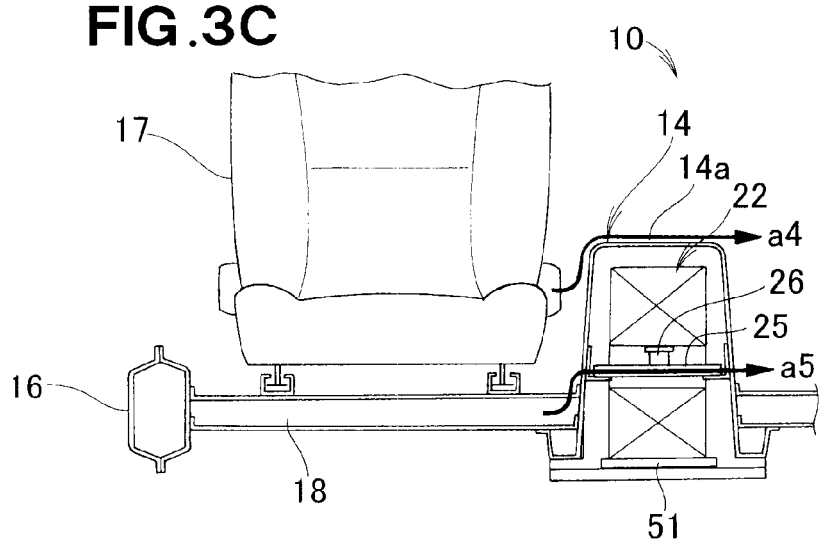

FIGS. 3A to 3C are views explanatory of an example manner in which a load is transmitted in the vehicle body floor structure shown in FIG. 1. At the time of a lateral or side collision, a collision load acts on a side sill 16 and seat 17 as indicated by a white arrow a1 in FIG. 3A. The load having acted on the side sill 16 and seat 17 is then transmitted via the seat 17 toward the floor tunnel 14 as indicated by an arrow a2 in FIG. 3B, but also transmitted via a seat cross member 18 toward the floor tunnel 14 as indicated by an arrow a3 in FIG. 3B.

Then, the load transmitted via the seat 17 is transmitted via the upper surface 14a of the floor tunnel 14 toward a side of the vehicle body as indicated beam arrow a4 in FIG. 3C, while the load transmitted via the seat cross member 18 to the floor tunnel 14 is further transmitted via the cross member 25 to the side of the vehicle body as indicated by an arrow a5 in FIG. 3C. Because the fuel cell stack 22 stored within the floor tunnel 14 is spaced, or substantially floating, from the sub chassis 21 and floor tunnel 14 via the resilient member 26 and the cushion member 51, the collision load hardly acts on the fuel cell stack 22.

In the vehicle body floor structure 10, as described above in relation to FIGS. 1-3, the stored component 22 is stored within the floor tunnel 14 provided on a laterally central portion of the floor panel 13 of the vehicle body and extending in the front-rear direction of the vehicle body, and the cross member 25 is passed through the passageway 53 formed through the stored component 22 in the width direction of the vehicle body. Further, the stored component 22 is supported on the cross member 25 via the resilient member 26, and the cross member 25 is fixedly connected at its opposite ends to the inner surfaces 31 of the left and right side walls of the floor tunnel 14.

The passageway 53 extending through the stored component 22 in the width direction of the vehicle body may be changed in position in the front-rear direction of the vehicle body so that the cross member 25 can be set at a desired position. In this way, the cross member 25 can be set at a suitable position (load input position) to which a load applied from a side of the vehicle can be efficiently transmitted. As a consequence, the instant embodiment can eliminate a need to increase reinforcement of the vehicle body and thereby reduce the weight of the vehicle body.

Further, because the stored component 22 is supported in a substantially floating manner within the floor tunnel 14 by being supported on the cross member 25 via the resilient member 26, no side collision load acts on the stored component 22 even when the side collision load is applied to the cross member 25.

As described above, the stored component 22 is a functional component having a fuel storage function, power generating function or electric power storage function, or a high-voltage electric system, and the stored component 22 is supported in a substantially floating manner within the floor tunnel 14 by being supported on the cross member 25 via the resilient member 26. Thus, a functional component having a fuel storage function, power generating function or electric power storage function, or a high-voltage electric system can be safely stored as the stored component within the floor tunnel 14.

More specifically, in the described embodiment, the stored component 22 is a fuel cell stack 22 that tends to cause vibrations and noise during generation of electric power. However, because the fuel cell stack 22 is supported in a substantially floating manner within the floor tunnel 14, vibrations and noise are hardly transmitted to the floor tunnel 14, so that noise within the passenger compartment can be effectively minimized.

According to the instant embodiment, where the stored component 22 is supported on the cross member 25 in a substantially floating manner via the resilient member 26 and stay member 27, the stored component 22 can be mounted (sub-assembled) to the cross member 25 in advance, which allows the cross member 25 and stored component 22 to be assembled together to the vehicle body with an increased ease.

Furthermore, because the cross member 25 is fastened or fixed to the horizontal bracket bottom surfaces 37 of the brackets 33 each projecting inwardly in a right-angled triangular shape from the corresponding inner surface 31, it can be fixedly fastened to the floor tunnel 14 from below, which can significantly enhance mounting operability of the cross member 25.

Furthermore, with the cross member 25 and the stay member 27 provided in perpendicularly intersecting relation to each other, the instant embodiment can stably support the stored component 22 that is, for example, elongated in the front-rear direction of the vehicle body.

Figure 4:
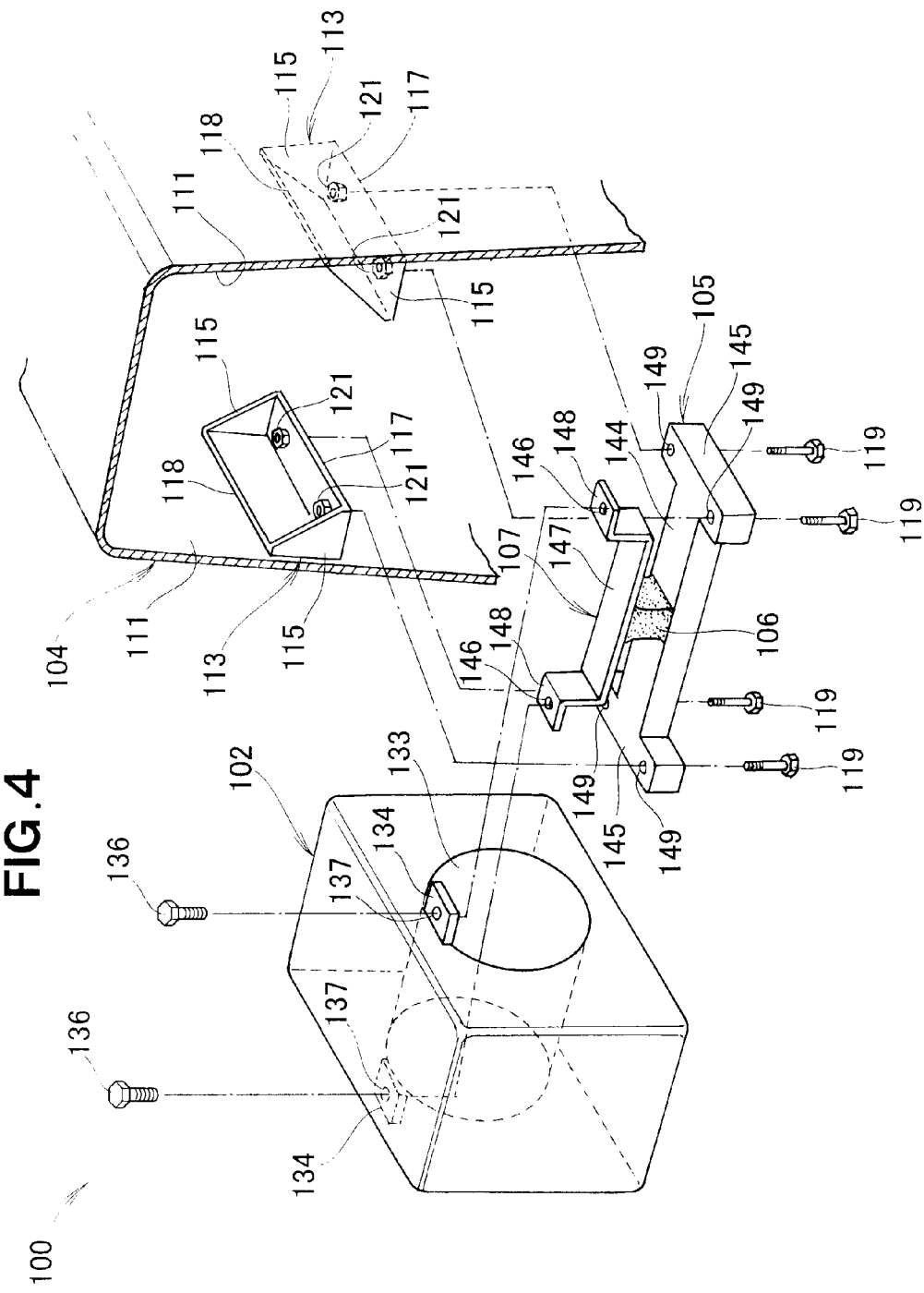
FIG. 4 is an exploded perspective view of another embodiment of the vehicle body floor structure of the present invention.
Figure 5:
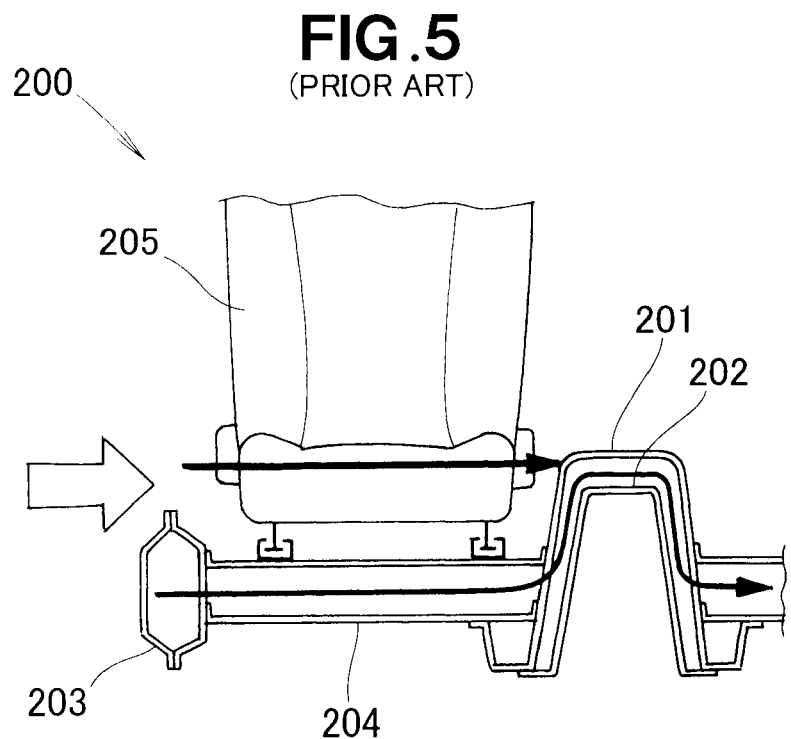
FIG. 5 is a view explanatory of a conventionally-known vehicle body floor structure.
Figure 6:
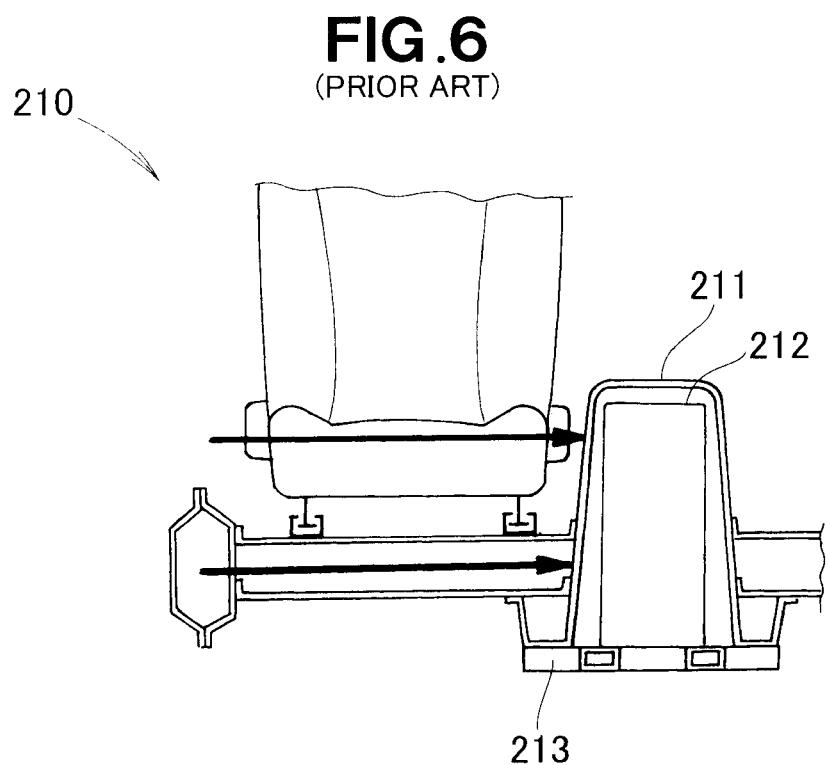
FIG. 6 is a view explanatory of another conventionally-known vehicle body floor structure with a stored component stored in a floor tunnel.

FIG. 4 is an exploded perspective view of a second embodiment of the vehicle body floor structure of the present invention. The second embodiment of the vehicle body floor structure 100 includes: a floor tunnel 104 provided on a laterally central portion of the floor panel (not shown in the figure) and extending in the front-rear direction of the vehicle body; left and right brackets 113 fixed to the inner surfaces 111 of opposed left and right side walls of the floor tunnel 104 and each projecting in a right-angled triangular shape from the inner surface 111 of the left or right side wall; an stored component 102 stored within the floor tunnel 104; a cross member 105 passed through the stored component 102 in the width direction of the vehicle body and fixed to the left and right brackets 113; and a stay member 107 that supports the stored component 102.

Each of the left and right brackets 113 has: front and rear projections 115 each projecting inwardly from the inner surface 111 of the left or right side wall; a horizontal bracket bottom surface 117 integrally formed with and extending between the lower end edges of the front and rear projections 115 so that one end portion of the cross member 105 is mounted on the horizontal bracket bottom surface 117; and a vertical surface 118 welded to the inner surface 31 of the left or right side wall.

Further, as viewed from the front of the floor tunnel 104, each of the left and right brackets 113 projects in a right-angled triangular shape from the inner surface 111 of the left or right side wall. The horizontal bracket bottom surface 117 has nuts 121 welded thereto so that bolts 119 are screwed into the nuts 121.

In this embodiment, the stored component 102 is a fuel tank for storing fuel. The fuel tank 102 has a passage way (opening) 133 for passage therethrough the cross member 105 and stay member 107. The fuel tank 102 also includes left and right flanges 134 having through-holes 137 for passage therethrough bolts 136.

The cross member 105 includes a body section 144 passed through the passageway of the fuel tank 102, and left and right mounting sections 145 for fixedly mounting to the left and right brackets 113. Furthermore, the cross member 105 has a substantially "I" shape as viewed in plan. The left and right mounting sections 145 each have through-holes 149 for passage therethrough the bolts 119.

The stay member 107 has a stay body section 147 that is supported via a resilient member 106, and mounting sections 148 bent from the opposite, i.e. left and right, ends of the stay body section 147. Each of the flange sections 148 has a bolt hole 146 formed therein for passage therethrough a bolt 136 for mounting a corresponding one of the flanges 134 of the fuel tank 102 to the flange section 148.

Further, in this embodiment, the stay member 107 is provided in parallel relation to the cross member 105. The fuel tank 102 is stored within the floor tunnel 104 in a substantially floating manner by being supported on the resilient member 106, and thus, a side collision load hardly acts on the fuel tank 102 as with the fuel cell stack 22 in the first embodiment of the vehicle body floor structure 10.

Whereas the vehicle body floor structure of the present invention has been described above as having the passageway formed in the stored component and extending in the width direction of the vehicle body as shown in FIG. 1, the present invention is not so limited, and the passageway may be a recess.

Further, other resilient members may be interposed between the front and rear retaining members 23 and the stored component 22 of FIG. 1.

The vehicle body floor structure of the present invention is well suited for application to passenger cars of a sedan type, wagon type, etc.

What is claimed is:

1. A vehicle body floor structure comprising:
   a floor tunnel provided on a laterally central portion of a vehicle body floor panel and extending in a front-rear direction of a vehicle body, a stored component being stored in the floor tunnel, the stored component having a passageway formed therein to extend in a width direction of the vehicle body; and
   a cross member passed through the passageway of the stored component and fixed at opposite ends thereof to inner surfaces of opposed side walls of the floor tunnel, the stored component being supported on the cross member via a resilient member, wherein the cross member is fixed at the opposite ends to horizontal bracket bottom surfaces each projecting in a substantially right-angled triangular shape from the inner surface of a corresponding one of the opposed side walls of the floor tunnel.

2. The vehicle body floor structure of claim 1, wherein the stored component is a functional component having a fuel storage function, power generating function or electric power storage function, or a high-voltage electric system.

3. The vehicle body floor structure of claim 2, wherein the stored component is a fuel cell stack.

4. The vehicle body floor structure of claim 1, wherein the cross member supports the stored component via a stay member that is supported, via the resilient member, in a substantially floating manner within the floor tunnel.

5. The vehicle body floor structure of claim 4, wherein the stay member is provided in perpendicularly intersecting relation to the cross member.

6. The vehicle body floor structure of claim 4, wherein the stay member is provided in parallel relation to the cross member.

* * * * *